United States Patent [19]
Obara et al.

[11] Patent Number: 5,723,926
[45] Date of Patent: Mar. 3, 1998

[54] STEPPING MOTOR

[75] Inventors: Rikuro Obara; Hirotaka Ichimura, both of Nagano-ken, Japan

[73] Assignee: Minebea Co., Ltd., Nagano-ken, Japan

[21] Appl. No.: 611,180

[22] Filed: Mar. 5, 1996

[30] Foreign Application Priority Data

Apr. 25, 1995 [JP] Japan .................... 7-124370

[51] Int. Cl.⁶ .................... H02K 5/15; H02K 5/04
[52] U.S. Cl. .................... 310/89; 310/42; 310/89; 310/90; 310/91; 310/258; 310/260; 29/596
[58] Field of Search .................... 310/91, 90, 42, 310/89, 258, 260; 29/596

[56] References Cited

U.S. PATENT DOCUMENTS

| | | | |
|---|---|---|---|
| 3,529,874 | 9/1970 | Hoddy | 310/90 |
| 4,455,498 | 6/1984 | DeSisto | 310/42 |
| 4,506,180 | 3/1985 | Shizuka et al. | 310/91 |
| 4,972,113 | 11/1990 | Newberg | 310/217 |
| 4,999,533 | 3/1991 | King et al. | 310/90 |
| 5,430,338 | 7/1995 | McMillan et al. | 310/89 |

FOREIGN PATENT DOCUMENTS

| | | | |
|---|---|---|---|
| A-1-2491267 | 4/1982 | France | 310/260 |
| A-1-2586869 | 3/1987 | France | 310/260 |
| 2416878 | 10/1975 | Germany | 310/90 |
| A-1-3930940 | 4/1990 | Germany | 310/89 |
| U-1-61854 | 4/1989 | Japan | 310/156 |
| A-1-286749 | 11/1989 | Japan | 310/89 |
| B2-3-24142 | 4/1991 | Japan | 310/49 R |
| 190543 | 8/1991 | Japan | 310/90 |
| A-4-49828 | 2/1992 | Japan | 310/89 |
| A-4-372456 | 12/1992 | Japan | 310/58 |

*Primary Examiner*—Steven L. Stephan
*Assistant Examiner*—Karl Eizo I. Tamai
*Attorney, Agent, or Firm*—Oliff & Berridge, PLC

[57] ABSTRACT

In the stepping motor, in which the stator core 4 is disposed outside the rotor 2 mounted on the rotation shaft, by the bearings 8, 9 mounted on the casings 10, the front and rear portion of the rotation shaft 1 are supported, and the casings 10, 11 are made of a press-molded metal plate.

The thin portions 10b, 11b of the casings 10, 11, which are in contact with the stator core 4 support one portion of the outer circumference of the stator core 4. Also, by the alternately folded portions 10c, 11c of the thin portions and the projections 10d, 11d the bearings 8, 9 are supported. Whereby, the thin portions 10b, 11b cover one portion of the stator core, so that dusts are prevented from being entered. Further, the folded portions 10c, 11c and the projections 10d, 11d enable the bearings 8, 9 to install and keep the correct posture.

1 Claim, 3 Drawing Sheets

5,723,926

STEPPING MOTOR

BACKGROUND OF THE INVENTION

1. Field of the Invention

The present invention relates to a stepping motor, in more detail, to the structure where an improvement is added to the casing concerning its workability in order to increase the productivity of the motor.

2. Description of the Prior Art

In general, a stepping motor comprises a stator core disposed outside a rotor mounted on a rotational shaft, and is so structured as bearings mounted on the casings provided on the front end and the rear end of the stator core support the rotational shaft port back and forth. Of the structures, the casings are usually manufactured with a die casting by the aluminum alloy or by a cutting processing. That structure is explained using FIG. 4. Reference numeral 1 is a rotation shaft, on the outer circumference of which rotors 2, 2 are provided. 3 is a spacer which keeps a given spacing between rotors 2, 2. Outside of the rotors 2, 2 a stator core 4 is disposed with a given small spacing. 5 is a stator coil.

On the front and rear portions of the stator core, as shown in figure, the casings 6, 7 are connected, which are manufactured by an aluminum die casting or by cutting processing. The end portions 6b, 7b of the outer circumferential portions 6a, 7a of the casings are manufactured with the precision to be in close contact with the total surface of the stator core 4, and the stator core 4 is clamped with not shown bolt. The casings 6, 7 comprise inter circumferences 6c, 7c inside the outer circumferences 6a, 7a, and these 6c, 7c support the bearings 8, 9 together with inner-directed annular portions 6d, 7d. The bearings 8, 9 support the rotational shaft 1 rotatably.

In the structure of the stepping motor of the above explained, since the end portions 6b, 7b of the outer circumferential portions 6a, 7a of the casings 6, 7 are in close contact with the total surface of the stator core 4, dusts are prevented from being entered in the casings 6, 7, and at the same time the positions of the bearings 8, 9 are kept correct, so that the precision of processing of the casings 6, 7 are to be outstandingly high, which causes to leave still the room for improvement for the yield of the manufacture and the cost.

As a conventional art, there is a Japanese Patent Laid-open No. Hei 4-372456, in which on the surface of a bracket (corresponding to the casings of this application), a black positive pole oxidized layer (alumite) is attached, which contributes to prevent from temperature-increasing and to raise the efficiency by increasing the rated capacity, but never aims to improve the workability of the casings as in this invention. As the other prior art, there are Japanese Patent Publication No. Hei 3-24142, Japanese Patent Laid-open Nos. Hei 1-286749, Hei 4-49828 and Japanese Utility Model Laid-open No. Hei 1-61854, in each one of which a resin-type of bracket (casing) is disclosed, which is contrary to the present invention which intends to maintain the metal casing.

Therefore, the present invention is carried out in light of the above problem and the object thereof is to provide a stepping motor, in which as the material a metal is maintained with a high yield rate without using aluminum alloy die casting method or a metal cutting.

SUMMARY OF THE INVENTION

In a stepping motor which comprises a stator core disposed outside and close to the rotor mounted on a rotation shaft which is supported by two bearings provided on two casings disposed on both ends of the stator core, the stepping motor is characterised in that said casings are prepared with a metal plate formed by pressing and the contact portion of the metal plate to the stator core is formed thinner in thickness, which portion supports one outer circumference portion of the stator core, and the portions of the casings to mount the bearings comprise each folded portions to hold the outer circumference portion of the bearing and annular projections to hold the outer sides of the bearings alternately.

By this construction, since one portion of the stator core is held by the thinner portion of the casings, the casings can be manufactured not so precisely and adapted to allow them to be closely in contact with the stator core, which prevents dusts from entering inside. And, by such construction as the alternate disposition of the folded portions and the annular projections, the bearings are held in a correct position.

EMBODIMENT

Figure 3:
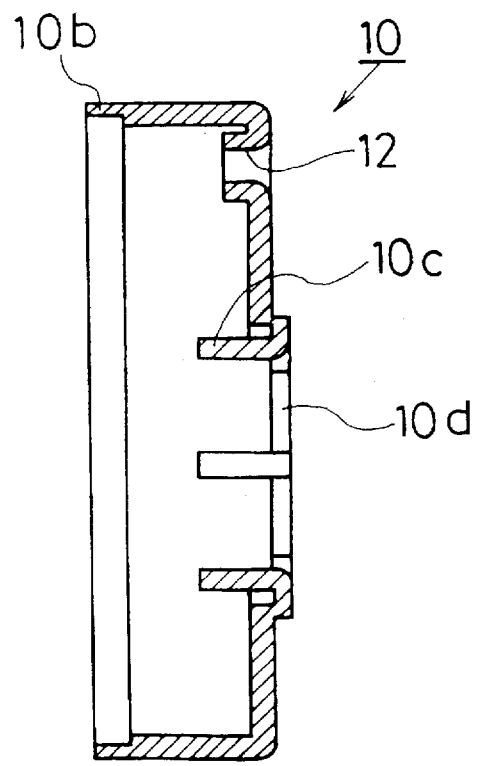
FIG. 3 is a sectional view along with A—A line of FIG. 1.
Figure 4:
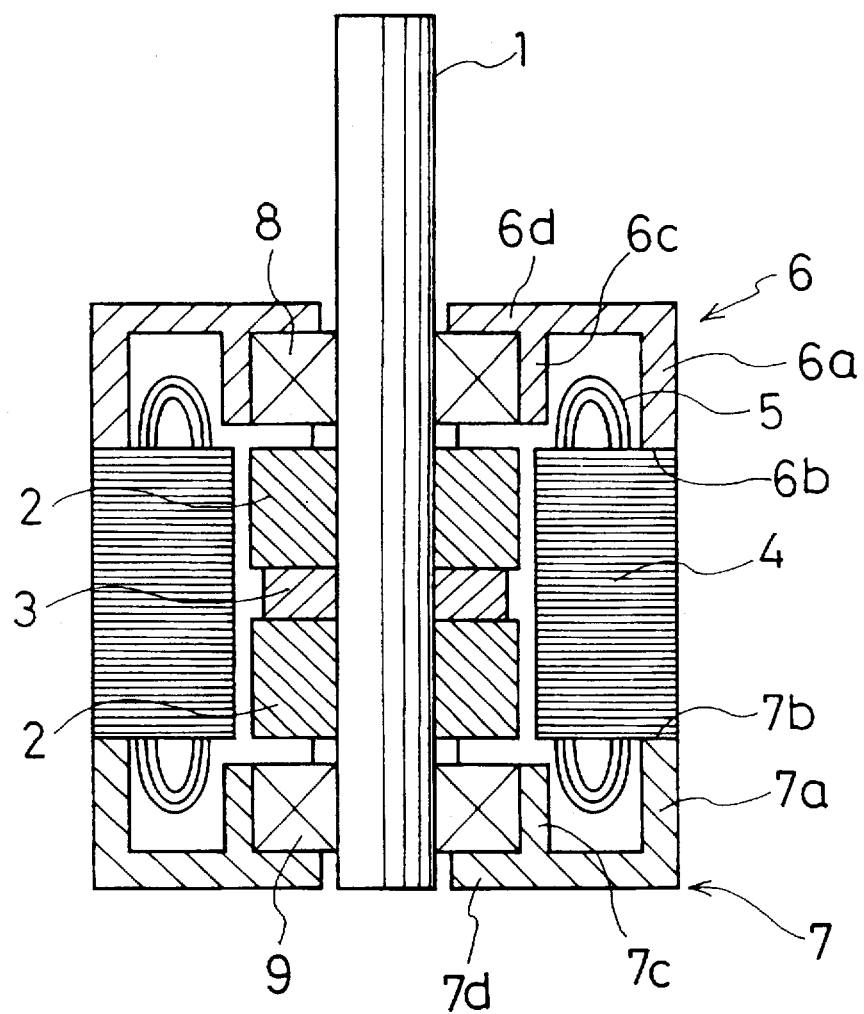
FIG. 4 is a sectional view of a conventional stepping motor.

Hereinafter, one embodiment of the present invention will be explained according to FIGS. 1–3, wherein the reference numerals identical with FIG. 4 are used same. In this stepping motor of this invention, the casings 10, 11 are prepared with metal plates formed by pressing. And, the one portion of outer circumference portions 10a, 11a thereof to be in contact with the stator core 4 is prepared thinner, and one portion of the outer circumference of the stator core 4 is clamped with this thin portions 10b, 11b of the casings 10, 11. On the other hand, the portions of the casings 10, 11 to attach the bearings 8, 9 are so constructed as to provide the folded portions 10c, 11c to accept the outer circumferences of the bearings 8, 9 and the annular projections 10d, 11d to accept outer sides of the bearings 8, 9 alternately.

Figure 1:
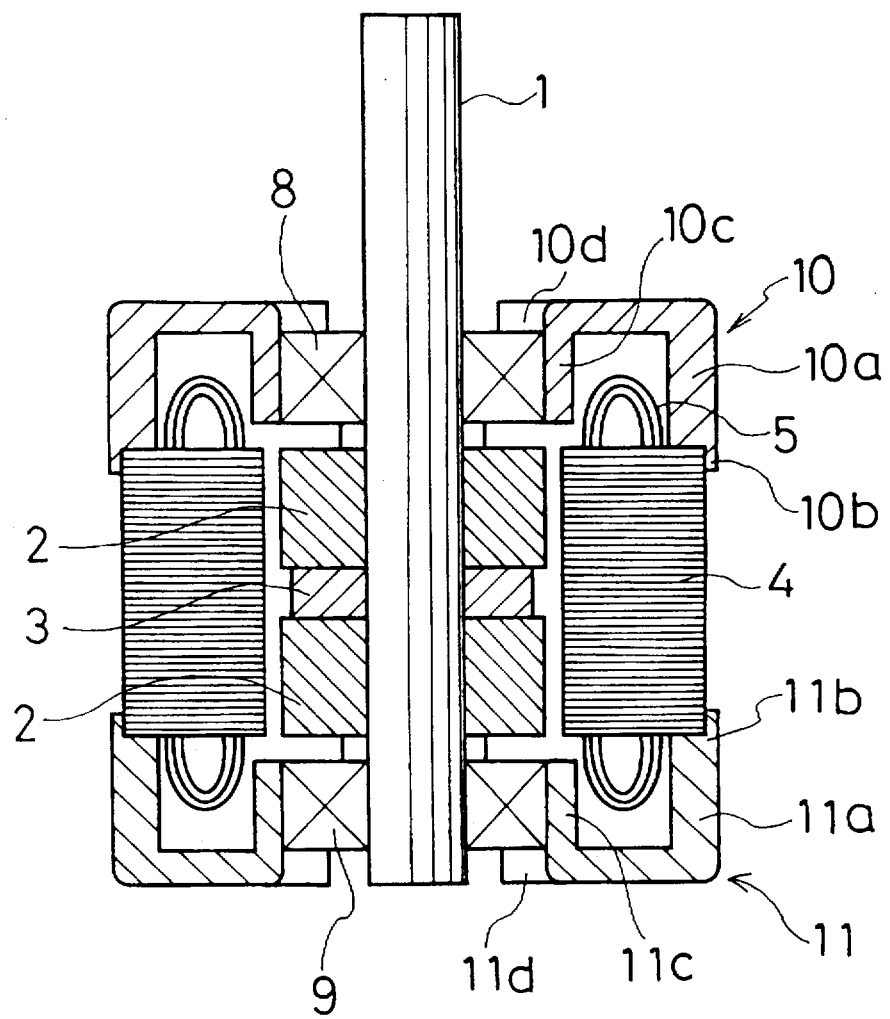
FIG. 1 is a sectional view of a stepping motor according to the present invention.
Figure 2:
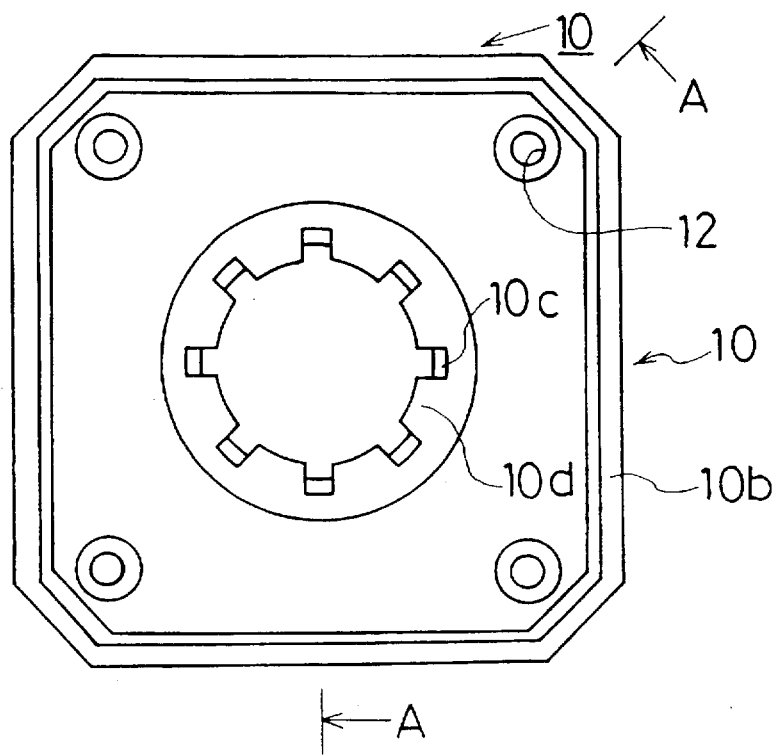
FIG. 2 is a bottom view of an upper casing of FIG. 1.

FIG. 2 is a bottom view of the casing 10 of FIG. 1 and FIG. 3 is a sectional view of along with A—A line of FIG. 2. Apparent from these Figs. the casing 10 (same in the casing 11), is formed in an approximately square with corners cut.

Even in thus constructed stepping motor, the function such as the stepped rotation, when supplying the electricity into the stator coil 5 and at every angle due to the supply of the electricity, appears same as the conventional stepping motor as shown in FIG. 4.

In the construction of the portion wherein the casings 10, 11 clamp the stator core 4, since the thin portions 10b, 11b clamp one portion of the outer circumference of the stator core 4 and the casings 10, 11 are tightened by the bolt, even though this portion is not manufactured in high precision, the dusts are prevented from entering from outside. And due to the constructions of the folded portions 10c, 11c to accept the outer circumferences of the bearings 8, 9 and the annular projections 10d, 11d to accept the outer sides of the bearings 8, 9 alternately, it becomes easy to mount the bearings 8, 9 on these portions.

The present invention relates to a stepping motor thus explained, the casing of which, in the conventional art, was manufactured in an aluminum die casting method or in cutting a metal, but in this invention, by forming it in pressing a metal plate. And, the joint portions of the casing with the stator core and the bearing are improved, so that, without increasing so much the working precision of the casings, dusts are prevented from entering inside and the bearings to support the rotation shaft are easy to be mounted.

What is claimed is:

1. A stepping motor comprising a rotor attached to a rotation shaft;

a stator core provided around an outer periphery of the rotor having a clearance therebetween;

a press-formed first metal plate casing and disposed at a front portion of the stator core in a first axial direction of the rotation shaft;

a press-formed second metal plate casing and disposed at a rear portion of the stator core in a second axial direction of the rotation shaft;

at least one bearing fixed to each of the first casing and the second casing for supporting the front portion and the rear portion of the rotation shaft;

wherein the first casing and the second casing include a first portion that supports the stator core, a second portion formed as one piece with the first portion that supports the at least one bearing, and at least one aperture disposed at each corner of each casing for clamping each casing and the stator core by bolts, wherein the first portion of the casing for supporting the stator core includes a contacting portion and a non-contacting portion, the contacting portion having a thickness less than a thickness of the non-contacting portion for supporting a circumferential part of the stator core, wherein the second portion for supporting the at least one bearing includes a plurality of folded portions extending alternatively in an axial direction of the rotation shaft and a plurality of annular projections extending in a radial direction of the rotation shaft, wherein the folded portions and the annular projections are formed as one piece with the first portion for supporting the stator core, the folded portions defining a radial dimension of the at least one bearing in radial direction, and the annular projections defining an axial dimension of the at least one bearing.

* * * * *